United States Patent [19]

Wright et al.

[11] Patent Number: 4,901,988
[45] Date of Patent: Feb. 20, 1990

[54] AUXILIARY TABLE FOR USE WITH A MACHINE TOOL

[75] Inventors: Larry E. Wright; Paul E. Hartley, both of Ottumwa, Iowa

[73] Assignee: Deere & Company, Moline, Ill.

[21] Appl. No.: 811,257

[22] Filed: Dec. 20, 1985

[51] Int. Cl.⁴ .............................................. B23Q 3/00
[52] U.S. Cl. ....................................... 269/16; 269/57
[58] Field of Search ...................... 269/57, 63, 67–70, 269/81–83, 85, 71; 408/90

[56] References Cited

U.S. PATENT DOCUMENTS

| | | | |
|---|---|---|---|
| 2,389,668 | 11/1945 | Johnson | 269/57 |
| 2,509,056 | 5/1950 | Gartner | 269/57 X |
| 2,672,773 | 3/1954 | Schofield | 269/57 |
| 2,716,362 | 8/1955 | Novak | 269/16 X |
| 2,751,823 | 6/1956 | Freter | 269/57 X |
| 4,167,264 | 9/1979 | Kretzmeir | 269/16 |
| 4,237,796 | 12/1980 | Gordon et al. | 108/22 |
| 4,418,901 | 12/1983 | Woods et al. | 269/71 |
| 4,521,950 | 6/1985 | Kase et al. | 29/568 |

Primary Examiner—Judy J. Hartman

[57] ABSTRACT

An auxiliary table is provided for use in combination with a machine tool having a horizontal table and a spindle mounted for moving vertically relative to the table. The auxiliary table includes a circular table top rotatably mounted to the top of a support pedestal. A plurality of fixtures and/or jigs are mounted to the table top in an outer, annular area thereof and the auxiliary table is placed such that by rotation of the top the fixtures may be selectively positioned below the machine tool spindle for holding a part for being operated on by a tool carried by the spindle. Tools are stored beside the fixtures and/or jigs.

5 Claims, 1 Drawing Sheet

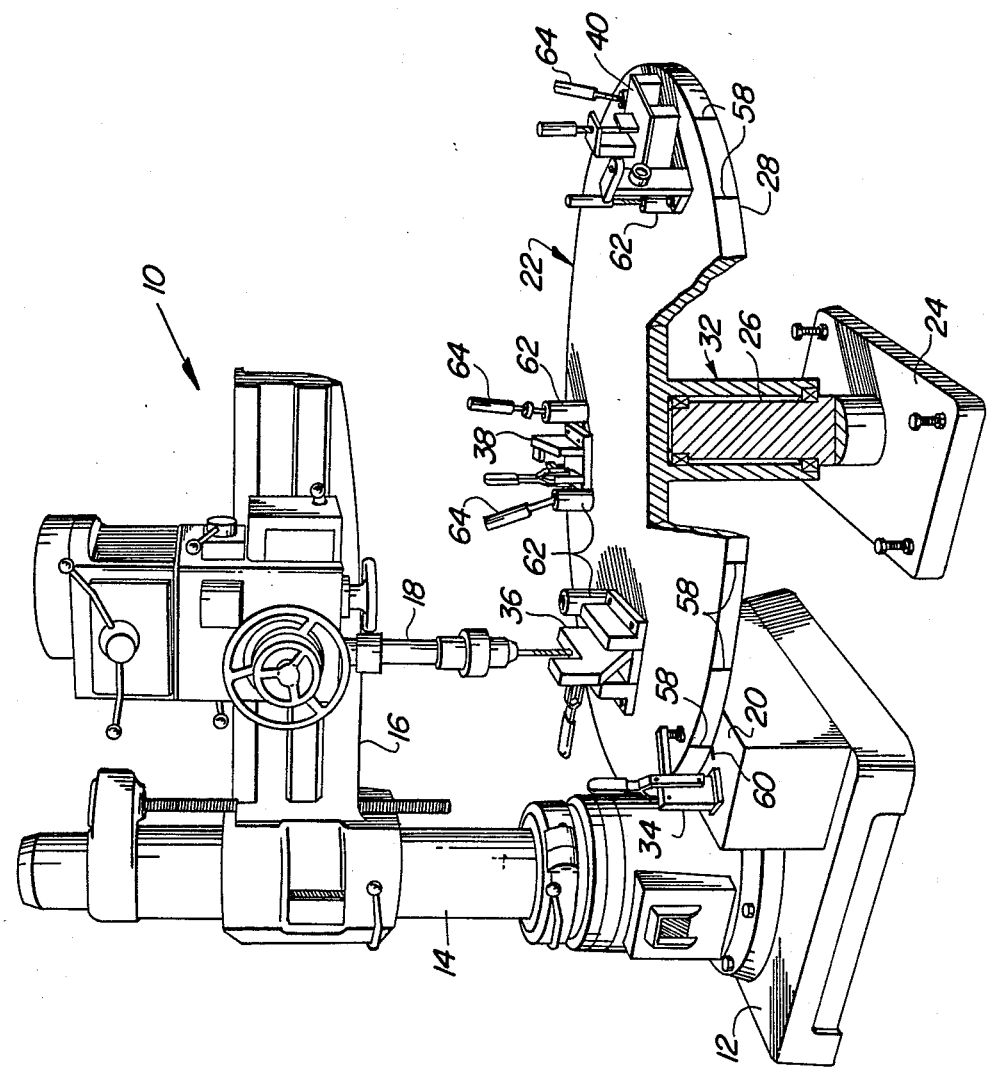

AUXILIARY TABLE FOR USE WITH A MACHINE TOOL

BACKGROUND OF THE INVENTION

The present invention relates to devices used in conjunction with machine tools having spindles which are vertically movable relative to a support table, such as upright drill presses, for example.

The most common way of holding a part for having a cutting or shaping operation performed thereon by a machine tool of the above-noted type is to use fixtures and/or jigs to secure the part to the machine table. It can take a considerable amount of time to refixture or jig (set up) a given part for having different machine tool operations performed thereon; and consequently to keep set-up and tear down time to a minimum, it has been the practice to set up several machines for respectively performing different operations on a part and to work on a considerable inventory of such parts once the machines are set up. This procedure has the disadvantage of requiring the use of several machines and of requiring the storage of the fixtures or jigs for a given part once a sufficient quantity of the part has been worked on to justify the set-up. Also, the parts must often be placed in inventory until they are needed in the manufacture of a device which embodies the part. The storage and retrieval of fixtures and jigs and parts is also a time-consuming task and the handling of these items may result in them being damaged or occasionally lost.

SUMMARY OF THE INVENTION

According to the present invention there is provided a table for use in conjunction with a machine tool.

A broad object of the invention is to provide an apparatus for use with a machine tool for eliminating the need for dismantling fixtures or jigs once they are set up for holding a given part in a desired orientation and the need for using several machines to perform different machine tool operations on a given part. A more specific object is to provide an auxiliary table for use with a machine tool, the table carrying a series of fixture and/or jig units for respectively holding a given part for having a series of operations performed thereon by the machine tool and being mounted for movement among a plurality of discrete positions for disposing a desired one of the fixture and/or jig units for correctly holding the part beneath the spindle of the machine tool.

Another object of the invention is to provide one or more tool holders adjacent each fixture and/or jig unit for storage of the appropriate tools to be used in the machine tool when the unit is moved into place.

Yet another object is to provide a table, as set forth above, which has a top formed by a circular plate, the plate being rotatably mounted to the top of a pedestal and the fixture and/or jig units being located in a circular outer zone of the table which passes beneath the machine tool spindle when the table top is rotated.

Still another object is to provide a table, as set forth in the immediately preceding object, wherein the outer zone of the table top passes closely above the machine tool table when the top is rotated and wherein clamp means is provided for clamping the table top to the machine table when the table top is in a desired position for disposing a selected fixture and/or jig unit beneath the machine tool spindle.

These and other objects, features and advantages of the present invention will become apparent to those skilled in the art from the description which follows and from the drawing.

BRIEF DESCRIPTION OF THE DRAWING

The sole FIGURE shows a rotary table carrying a plurality of fixture and/or jig units for being selectively positioned beneath the spindle of a machine tool.

DESCRIPTION OF THE PREFERRED EMBODIMENT

Referring now to the drawing, there is shown a typical machine tool 10 here shown as an upright drill press. The machine tool 10 includes a base 12, an upright column 14 projecting upwardly from the base, a head 16 secured to the top of the column, a vertically shiftable spindle 18 projecting downwardly from the head and a horizontal table 20 supported beneath the spindle by the base and column.

An auxiliary table 22 is provided for use with the machine tool 10. Specifically, the table 22 includes a pedestal 24 bolted securely to the floor and having an upper end defined by a vertical axle 26. A table top 28 in the form of a cylindrical plate is rotatably mounted on the axle 26 by a bearing assembly 32 including tapered roller bearings for making the top 28 easy to turn manually. The table top 28 is located such that an outer portion thereof extends over the machine tool table 20 and such that an outer annular area of the top passes beneath the spindle 18 when the top is turned. the bottom of the table top 28 is disposed in horizontal plane only slightly above the top of the machine tool table 20. Mounted to the table 20 is a toggle clamp 34 for clamping the table top 28 tightly against the table 20 for a purpose described hereinbelow.

Spaced about and bolted to the annular outer portion of the table top 28 are a plurality of fixture and/or jig units 36-40. The units 36-40 may respectively be configured to hold a given part, or various parts in different positions, for having different operations performed thereon. The units 36-40 are each located so that when the table top 28 is indexed or turned to a predetermined position associated with a given unit, the unit will be positioned for holding a desired part beneath the spindle 18 for correctly being operated on by a tool carried by the spindle. Accurate positioning of the table top 28 relative to the spindle can be accomplished by moving the spindle downwardly and turning the table until the tool carried by the spindle correctly enters a tool guide forming part of the desired fixture and/or jig unit. Once correctly positioned, the table top 28 may be clamped into place by the toggle clamp 34. Correct alignment may alternatively be accomplished by matching a selected one of a plurality of vertical positioning marks 58 located about the periphery of the table top with a mark 60 provided on the machine tool table 20.

Associated with each of the fixture and/or jig units 36-40 and fixed to the table top 26 adjacent a given unit is one or more tool holders 62 storing appropriate tool or tools 64 for performing an operation or operations on a part held by the unit.

We claim:

1. In combination with a machine tool having a vertically shiftable spindle and a horizontal table located beneath said spindle, an auxiliary table comprising: a table top support; a horizontal table top; low friction means mounting the table top to the support for horizontal movement along a path extending beneath said spindle and above and very close to the table of the machine tool with an elongate area of said table top being positioned for movement along said path; a clamp means mounted to the table of the machine tool at a location adjacent said path for releasably clamping said table top downwardly against the machine tool table at any one of a plurality of preselected positions, the machine tool table thereby providing additional support for the table top; and a plurality of fixtures mounted to the table top in said elongate area and respectively being associated with said plurality of preselected positions such that when the table top is in one of the preselected positions the associated fixture will be positioned for holding a part correctly for being worked on by a tool carried by the spindle.

2. The invention defined in claim 1 and further including at least one tool holder mounted to the table top adjacent each fixture for holding an appropriate tool for use in the machine tool spindle for performing the operation for which the fixture is set up.

3. The invention defined in claim 1 wherein said table top is in the form of a circular plate.

4. The invention defined in claim 3 wherein said elongate area of the table top is an outer annular area thereof.

5. The invention defined in claim 3 wherein said table top support is in the form of a pedestal located centrally beneath said table top.

* * * * *